DIFFUSION TRANSFER RECEIVING LAYER WITH HIGH SODA CONTENT

Filed Jan. 16, 1963

INVENTOR
WALTER LIMBERGER
RUDOLF WENDT

Karl F. Ross
AGENT 3,450,535

DIFFUSION TRANSFER RECEIVING LAYER WITH HIGH SODA CONTENT

Walter Limberger, Hamburg-Poppenbuttel, and Rudolf Wendt, Harksheide, Bezirk, Hamburg, Germany, assignors to Lumoprint Zindler K.G., Hamburg, Germany, a corporation Filed Jan. 16, 1963, Ser. No. 251,794
Claims priority, application Germany, Jan. 25, 1962, L 41,052
Int. Cl. G03c *1/48*
U.S. Cl. 96—76 2 Claims

ABSTRACT OF THE DISCLOSURE

A method of producting nonreversed positive images solely with the use of water as a developing agent and to the exclusion of other developing agents in a diffusion-developable system wherein a photosensitive silver-halide emulsion-negative layer is exposed to form a latent image, the negative layer or image-receiving positive layer is treated with water, and the layers brough into contact for diffusion transfer of the image; the improvement resides in incorporating an excess of alkali in the image-receiving layer, i.e. at least 3 grams of alkali for each 50 ml. of the solution (also containing a silver-halide solvent and a silver-diffusion-developing nucleating agent). Typical image-receiving layers are formed by coating solutions of 7 g. polyvinyl alcohol, 20 ml. glycerine, 3 g. soda, 1.5 g. $K_2S_2O_5$, 0.005 g. $AgNO_3$ and 5.0 g. gelatine, 20 ml. glycerine, 0.5 g. aluminum hydroxide, 3.0 g. soda, 1.5 g. potassium metabisulphite, 0.5 g. potassium thiosulphate, 0.005 g. silver nitrate per 50 ml. of water onto the positive layer carrier.

Figure 1:
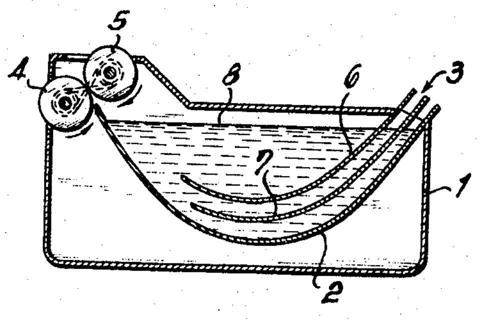

The present invention relates to a method for making positive illustrations on the correct side by transferring the reacting substances from a transfer sheet or layer exposed in accordance with the image, to a receiving sheet or layer with the use of a liquid phase between the two flat copying layers, a latent image being produced by the action of radiation in the so-called "transfer" sheet material in acordance with an original master copy or pattern.

The invenion also relates to a material for use in this method.

In the case of known methods, the copying materials, for example sheets are passed through a chemical bath, a so-called developer fluid or a treatment solution, separated from each other or in contact with each other over a portion of the travel path through the bath. For example, if, in the case of known silver salt diffusion processes, a latent image is produced in a photograph layer by exposure and developed in contact with preferably gelatinous reducing layer containing collodial silver capable of dissolving the unexposed silver halide. The treatment solution used in this case is a chemical solution having an alkaline developer. It is unpleasant to handle and requires comparatively complicated work, such as the mounting and cleaning of the procesisng apparatus from the residues of the alkaline developer. The durability of the developer is low it becomes deposited, however, on parts of the apparatus. Such a method is described for example in German patent specification 764,572.

Furtherfore it is known to carry out such a diffusion process by the action of heat. For example a material is processed, the layers of which are provided with substances such as sodium sulphate which split off water of crystallization when heated above their melting point. This water of crystallization dissolves developer and fixing agents, the development and fixing being exclusively obtained by heating.

Thus there are in principle two basic methods, one of which operates with a chemical treatment solution and consequently has the disadvantages associated therewith, while the other type, the so-called heat method, requires a different type of apparatus and, therefore a reequipping of the possible users.

This invention concerns more particularly a silver salt diffusion process which produces black and white copies of execellent quality.

An object of the invention is to provide a method and a material for carrying out diffusion processes which require no chemical treatment baths. A further object of the invention is to provide a method and a material which makes it possible to prepare copies according to the silver salt diffusion process by using known apparatus without a chemical treatment fluid.

Yet another object of the invention is ot provide a method and a material, the use of which renders possible unlimited storage copying materials without stocking additional chemicals.

Yet another object of the invention is to provide a mehod and a material which, while retaining the usual apparatus hitherto required for carrying out the silver salt diffusion process, with treatment baths, surmounts the disadvantages thereof and considerably facilitates this process despite the use of a liquid supply. Any application of heat being avoided in the preferred embodiment.

According to the present invention water is added to at least one copying material before or during the establishment of mutual contact, in order to develop and fix the latent image by dissolution and transfer of the substances between the copying materials which contain all of the requisite substances for diffusion transfer in a form which enables them to be dissolved in water.

In a simple embodiment the sheet-form copying materials are passed through a water bath before they are passed thruogh a water bah before they are brought into contact with each other.

In accordance with another embodiment the water is applied only to the layered side of one or both copying layers a technique which can be effected by means of conventional surface development, for example.

Another embodiment provides for evaporation of the water from the point of view of wetting only one layer side. Other methods of applying water to the layers include the use of a spray jet which is directed at one or both layers or in an atomized unit through which the material is passed.

While the copying materials are in contact with each other, a pressure is applied in known manner to the sheets of copying material in order to establish positive surface engagement of the appropriate layers.

After the dampened copying materials are brought together, and subsequent separation thereof an after treatment by conventional washing and/or drying is possible.

In carrying out the method of preparing copies according to the silver salt diffusion process, a positive is used in accordance with the present invention, which has an increased adition of alkali, the words "increased addition" referring to the composition of the layer as is known in the heat process. It is assumed that in the heat process up to two grams of alkali is used in a deposit for the layer with fifty ml. $H_2O$. A preferred embodiment of this invention provides for the addition of approximately 1½ times the amount of alkali, for example, soda, while preferably approximately three times the usual amount of potassium metabisulphite is also provided. Instead of the latter substance, any other conventional complex former such as sodium thiosulphate can be used in a similarly augmented proposition.

A further advantageous feature resides, in conjunction with the method fo the present invention, in the use of a negative silver halide layer, (e.g., with gelatine as the layer former or matrix), an alkali-reacting substance (preferably urea) being added to the layer, apart from the usual developing agents.

In the following, preferred examples are given of materials which can be used for carrying out the silver salt diffusion process of the present invention with ordinary water constituting the liquid medium.

Formula for preparing a transfer material:

| | | |
|---|---|---|
| $H_2O$ | ml | 100 |
| Gelatine | g | 9 |
| NaCl | g | 1.2 |
| $AgNO_3$ | g | 2.4 |
| Metol | g | 0.5 |
| Hydroquinone | g | 1.5 |
| Citric acid | g | 0.5 |
| Potash alum | g | 0.5 |
| Urea | g | 1.5 |
| Alcohol | ml | 20 |

These substances are processed in the usual manner and applied to a sheet-form layer carrier, preferably of fibrous material, such as paper or a synthetic material.

Formula for a receiving material:

| | | |
|---|---|---|
| $H_2O$ | ml | 50 |
| Polyvinyl alcohol | g | 7 |
| Glycerine | ml | 20 |
| Soda | g | 3 |
| $K_2S_2O_5$ | g | 1.5 |
| Mirasol (2%) | ml | 5 |
| $AgNO_3$ | g | 0.005 |

These substances are also processed in the usual manner, applied to a sheet form layer carrier and dried.

In these formulae, the absence of substances giving off water of crystallization is important, because the material is more capable of storage than known materials having such substances.

Formula for another receiving material:

| | | |
|---|---|---|
| Water | ml | 50 |
| Gelatine | g | 5.0 |
| Glycerine | ml | 20 |
| Aluminum hydroxide | g | 0.5 |
| Soda | g | 3.0 |
| Potassium metabisulphite | g | 1.5 |
| Potassium thiosulphite | g | 0.5 |
| Mirasol | ml | 5 |
| Silver nitrate | g | 0.005 |

In use the transfer material is exposed to light in exposing relationship with an original and then brought into surface contact with the positive with application of water to the transfer-layer face to develop the latent image only with chemicals present in the layers it is passed through a pair of conventional squeezing rollers for example.

The processing of the material, with the addition of water only, simplifies the carrying out of the method, because there is no risk of damage to clothing from stray spray, as exists when conventional chemical treatment solutions are used.

Furthermore it is unnecessary to clean the apparatus as often as has previously been necessary.

By comparison with the costs involved in operating conventional apparatus for the silver salt diffusion process or for other processes working with a chemical-developer solution, the economies attainable with the present invention which, operates with the addition of water only, are surprising, since the elimination of chemical treatment solutions has long been studied without a practical solution being found.

Figure 2:
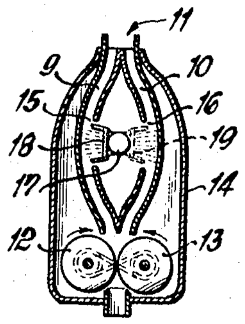
Figure 3:
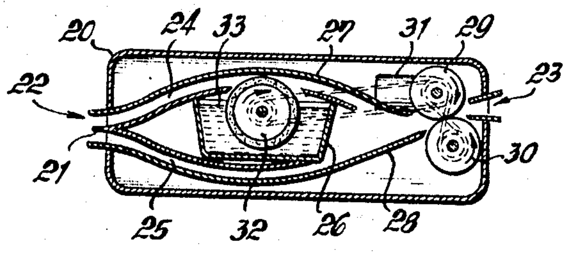

The invention will be described further, by way of example, with reference to the accompanying drawing, in which:

FIGS. 1 to 3 are schematic side elevations of different apparatus for carrying out the invention, in cross section, only the basic parts being shown.

According to FIG. 1 a trough 2, having an impermeable base, is disposed in a frame 1; trough 2 extends from an inlet opening 3 to the gap between two squeezing and feed rollers 4, 5 which are in resilient engagement with each other in the frame 1 and are driven in the direction of the arrows (i.e. opposite senses). Positioned above the base of the trough are two curved guide components 6, 7 which extend from the inlet slot 3 and terminate in the region of the rising portion of the base 2 at a distance from the rollers 4, 5. The trough 2 is filled with water, up to the broken line 8. Two sheets of copying material, i.e., an exposed negative and a positive, placed in the guide paths between the parts 2 and 7, 7 and 6 respectively, are wetted with water and, in contact with one another are passed through the gap between the roller pair 4, 5 and then, if desired, separated after a time. The image layer side of the positive can then be washed and/or dried.

In the system of FIG. 2, two guide paths 9, 10, defined by guide components, lead from a divided inlet opening 11 to the gap between the squeezing and feed rollers 12, 13 which are diven by a motor (not shown) in the casing 14, in the direction of the arrows.

The guide paths are remote from one another in their central area and are provided on their opposite sides with openings 15, 16. A spray-developing device 17 is disposed between the guide paths. In one embodiment, this device 17 is connected to a water supply, a pump and a nozzle arrangement 18 disposed in the opening 15. Water is sprayed through this nozzle arrangement by the pump of the device 17, onto the layer carrier running through the guide path 9.

A corresponding nozzle arrangement 19 can also be provided in the opening 16, as shown in broken lines.

In accordance with another embodiment, the device 17 has an evaporating system for water, i.e. a heat source; thus steam may be sprayed or directed through the nozzles 18, 19 on to the layer carriers passing through the paths 9, 10.

The layer carriers are introduced with their opposed layers through the divided opening 11 into the guide path 9, 10 and pass between the rollers 12, 13. After passing through these they are separated, if desired, after a short period during which the layer carriers are left in contact with each other. After-treatment can be effected as stated above.

FIG. 3 shows a flat casing 20 for a table apparatus having an inlet aperture 22 divided by a guide member 21 and an outlet aperture 23 in the opposite casing wall. Progressively separating guide paths 24, 25 extend from the inlet aperture 22, the first 24 of which passes over the top of a trough 26 filled with water and the latter 25 runs along the base of the trough.

The guide paths are limited on their sides remote from each other by guide surfaces 27, 28 which bring together the paths forwardly of a pair of squeezing and feed rollers 29 and 30, which are journalled to rotate in the casing. These rollers are driven in the direction of the arrows. They are in engagement with each other by means of gear wheels for example. The motor is indicated at 31.

A roller 32 is rotabably journalled in the trough 26 and is driven for example by the motor 31 in the direction of the arrow and extends from below into the guide path 24. By this means the downwardly turned layer of a sheet of material conveyed along this guide path is wetted with water which fills the trough for example as far as the line 33. The roller 32 may have a jacket of absorbent material.

We claim:

1. In a positive sheet for the production of nonreserved positive images by the diffusion transfer of a latent image formed upon exposure of a photosensitive diffusion-developable silver-halide-empulsion negative layer upon contact with said negative layer after the exposure thereof to form said latent image and upon the wetting of said negative layer or said positive sheet with water to the exclusion of any other developing agent, the improvement wherein said sheet has an image-receiving layer prepared by depositing upon a positive-layer carrier, an aqueous solution of a photographic-development alkali, a nucleating agent for the development of diffusion-transferred silver image and a silver-halide solvent, said alkali being present in said image-receiving layer in an amount of the order of 3 grams for each 50 ml. of water of said solution, said solution containing, per 50 ml. of water:

| | | |
|---|---|---|
| Polyvinyl alcohol | g | 7 |
| Glycerine | ml | 20 |
| Soda | g | 3 |
| $K_2S_2O_5$ | g | 1.5 |
| $AgNO_3$ | g | 0.005 |

2. In a positive sheet for the production of nonreversed positive images by the diffusion transfer of a latent image formed upon exposure of a photosensitive diffusion-developable silver-halide-emulsion negative layer upon contact with said negative layer after the exposure thereof to form said latent image and upon the wetting of said negative layer or said positive sheet with water to the exclusion of any other developing agent, the improvement wherein said sheet has an image-receiving layer prepared by depositing upon a positive-layer carrier, an aqueous solution of a photographic-development alkali, a nucleating agent for the development of diffusion-transferred silver image and a silver-halide solvent, said alkali being present in said image-receiving layer in an amount of the order of 3 grams for each 50 ml. of water of said solution, said solution containing, per 50 ml. of water:

| | | |
|---|---|---|
| Gelatine | g | 5.0 |
| Glycerine | ml | 20 |
| Aluminum hydroxide | g | 0.5 |
| Soda | g | 3.0 |
| Potassium metabisulphite | g | 1.5 |
| Potassium thiosulphate | g | 0.5 |
| Silver nitrate | g | 0.005 |

References Cited

UNITED STATES PATENTS

| | | | |
|---|---|---|---|
| 2,992,102 | 7/1961 | Land | 96—76 XR |
| 3,179,517 | 4/1965 | Tregillus et al. | 96—76 XR |
| 2,543,181 | 2/1951 | Land | 96—29 |
| 2,725,298 | 11/1955 | Yutz | 96—29 XR |
| 2,982,650 | 5/1961 | Land | 96—29 XR |
| 3,042,514 | 7/1962 | Roth | 96—29 |
| 3,063,837 | 11/1962 | Lassig | 96—29 |

FOREIGN PATENTS

| | | |
|---|---|---|
| 1,242,298 | 8/1960 | France. |
| 767,978 | 2/1957 | Great Britain. |

OTHER REFERENCES

Photo Dictionary & Quick Reference Guide; Guides 108, 109 and 115. Pub. 1957 by Morgan & Morgan, Inc.

Hill, Photographic Engineering, vol. 4, No. 4, pp. 214–219 (1953).

DONALD LEVY, *Primary Examiner.*

U.S. Cl. X.R.

96—29